US011866992B2

(12) United States Patent
Kwak et al.

(10) Patent No.: US 11,866,992 B2
(45) Date of Patent: Jan. 9, 2024

(54) CORDLESS OPERATING SAFETY BLIND

(71) Applicant: Jae-Suk Kwak, Paju-si (KR)

(72) Inventors: Jae-Suk Kwak, Paju-si (KR); Woo-Jin Kwak, Paju-si (KR)

(73) Assignee: Jae-Suk Kwak, Paju-si (KR)

(*) Notice: Subject to any disclaimer, the term of this patent is extended or adjusted under 35 U.S.C. 154(b) by 0 days.

(21) Appl. No.: 17/056,310

(22) PCT Filed: May 17, 2019

(86) PCT No.: PCT/KR2019/005900
§ 371 (c)(1),
(2) Date: Nov. 17, 2020

(87) PCT Pub. No.: WO2019/221538
PCT Pub. Date: Nov. 21, 2019

(65) Prior Publication Data

US 2021/0214996 A1 Jul. 15, 2021

(30) Foreign Application Priority Data

May 17, 2018 (KR) ........................ 10-2018-0056247

(51) Int. Cl.
*E06B 9/322* (2006.01)
*E06B 9/303* (2006.01)
*E06B 9/382* (2006.01)
*E06B 9/384* (2006.01)

(52) U.S. Cl.
CPC .............. *E06B 9/322* (2013.01); *E06B 9/303* (2013.01); *E06B 9/382* (2013.01); *E06B 9/384* (2013.01)

(58) Field of Classification Search
CPC . E06B 9/382; E06B 9/322; E06B 9/34; E06B 9/60; E06B 9/303; E06B 9/307; E06B 9/32; E06B 9/384; E06B 2009/3222
See application file for complete search history.

(56) References Cited

U.S. PATENT DOCUMENTS

| | | | | |
|---|---|---|---|---|
| 1,828,623 A * | 10/1931 | Sacerdote | E06B 9/60 | 160/265 |
| 1,845,870 A * | 2/1932 | Theodore | E06B 9/307 | 160/175 |
| 2,061,548 A * | 11/1936 | Cameron | E06B 9/382 | 160/178.3 |
| 2,202,752 A * | 5/1940 | Brenner | E06B 9/384 | 160/178.3 |
| 2,307,095 A * | 1/1943 | Zaferakis | E06B 9/60 | 160/326 |

(Continued)

FOREIGN PATENT DOCUMENTS

| | | |
|---|---|---|
| CN | 202249684 U * | 5/2012 |
| CN | 202731711 U | 2/2013 |

(Continued)

*Primary Examiner* — Johnnie A. Shablack
(74) *Attorney, Agent, or Firm* — Rabin & Berdo, P.C.

(57) ABSTRACT

The present invention relates to a safety blind that operates without a cord. More specifically, there is no danger of safety accidents because a lifting cord inserted into a fabric tube of a leather cord is not exposed to the outside, the lifting and tilting operation of an entire slat can be easily and simply performed by operating a lower slat, and a driving unit can be applied to Venetian blinds, roll blinds, and various blinds.

4 Claims, 24 Drawing Sheets

(56) References Cited

U.S. PATENT DOCUMENTS

| | | | | | |
|---|---|---|---|---|---|
| 2,393,819 | A * | 1/1946 | Smith | E06B 9/384 | 160/178.3 |
| 2,413,464 | A * | 12/1946 | Nihon | E06B 9/384 | 160/176.1 R |
| 2,633,909 | A * | 4/1953 | Foglio | E06B 9/384 | 160/178.3 |
| 5,595,231 | A * | 1/1997 | Marocco | E06B 9/384 | 160/178.3 |
| 5,743,319 | A * | 4/1998 | Christopherson | E06B 9/384 | 160/173 R |
| 5,769,140 | A * | 6/1998 | Tuzmen | E06B 9/305 | 160/178.3 |
| 5,918,657 | A * | 7/1999 | Tuzmen | E06B 9/384 | 160/168.1 R |
| 6,135,189 | A * | 10/2000 | Weinreich | E06B 9/62 | 160/171 |
| 6,557,615 | B2 * | 5/2003 | Smith | E06B 9/303 | 160/178.3 |
| 7,082,983 | B2 * | 8/2006 | Coulibaly | E06B 9/60 | 160/323.1 |
| 7,866,367 | B2 * | 1/2011 | Liang | E06B 9/323 | 74/397 |
| 8,002,012 | B2 * | 8/2011 | Cheng | E06B 9/322 | 160/176.1 R |
| 8,820,385 | B2 * | 9/2014 | Wu | E06B 9/322 | 160/170 |
| 8,857,493 | B2 * | 10/2014 | Perkowitz | E06B 9/58 | 160/84.01 |
| 2007/0261798 | A1 * | 11/2007 | Hung | E06B 9/322 | 160/170 |
| 2013/0048233 | A1 * | 2/2013 | Lin | E06B 9/326 | 160/168.1 R |
| 2013/0233499 | A1 * | 9/2013 | Wu | E06B 9/322 | 160/218 |
| 2014/0284006 | A1 * | 9/2014 | Liang | E06B 9/303 | 160/178.1 R |
| 2015/0354271 | A1 * | 12/2015 | Hsu | E06B 9/322 | 160/173 R |
| 2018/0371830 | A1 * | 12/2018 | Nicolosi | E06B 9/303 | |
| 2019/0352961 | A1 * | 11/2019 | Chen | E06B 9/384 | |
| 2020/0362630 | A1 * | 11/2020 | Akiba | E06B 9/60 | |
| 2021/0017813 | A1 * | 1/2021 | McCarty | E06B 9/322 | |
| 2021/0032930 | A1 * | 2/2021 | Chen | E06B 9/326 | |
| 2021/0317702 | A1 * | 10/2021 | Liang | E06B 9/384 | |

FOREIGN PATENT DOCUMENTS

| | | | |
|---|---|---|---|
| DE | 102015004760 | B3 * | 5/2016 |
| DE | 202019104238 | U1 * | 10/2019 |
| JP | 3432765 | B2 | 8/2003 |
| KR | 200305692 | Y1 | 3/2003 |
| KR | 2020140001111 | U | 2/2014 |
| KR | 101553767 | B1 | 9/2015 |

* cited by examiner

CORDLESS OPERATING SAFETY BLIND

CROSS REFERENCE TO RELATED APPLICATION

Background of the Invention

Field of the Invention

The present invention relates to a safety blind that operates without a cord. More specifically, there is no danger of safety accidents because a lifting cord inserted into a fabric tube of a leather cord is not exposed to the outside, the lifting and tilting operation of an entire slat can be easily and simply performed by operating a lower slat, and a driving unit can be applied to Venetian blinds, roll blinds, and various blinds.

Description of the Related Art

In general, a blind is a device that is usually installed over a transparent window of a house or an office to maintain an appropriate luminous intensity by blocking direct light such as sunlight or adjusting the amount of interior light.

The configuration of a blind in the related art is described hereafter with reference to a 'Winding device for the blind' disclosed in Korean Utility Model No. 20-0305692.

As shown in FIGS. 1 to 3 of the accompanying drawings, there is shown a blind winder that moves up/down a blind 10 by turning a pulling string 4 of the blind 10 installed on a rail R.

The blind winder includes: a driving unit including a first body 3 that has a coupling member 21 fitted in a first end of the rail R, has a fixing hole 1, and has a coupling groove 2 open downward, a driving pulley 5 that is disposed in the coupling groove 2 of the first body 3 to wind a pulling string 4, and a fixing shaft 6 that rotatably fixes the driving pulley 5 and has a ring-shaped locking step 6*b* to prevent separation of the driving pulley 5;

a driven unit including a second body 9 that has a coupling pin 22 fitted in a second end of the rail R and a rotary shaft 8 that is coupled to the second body 9 and the driving pulley 5 at both ends to rotate when the pulling string 4 is pulled; and a rotary unit including a housing 12 that has coupling members 12*b* and 12*c* symmetrically disposed at an upper portion to slide on the rail R and has holes 12*d* at a lower portion to pass lift cords 11 connected to slats 10*a* of the blind 10, a winding reel 14 that is rotatably combined with the housing 12 and has the rotary shaft 8 therein to wind the lift cords 11 by rotating when the pulling string 4 is pulled, an angle change cap 15 that forcibly fitted on any one side of the winding reel 14 protruding out of the housing 12 to rotate at a predetermined angle and the idle only in the early rotation of the winding reel 14, and angle change ladder cords 16 that has an upper end connected to the angle change cap 15 and a lower end supporting the bottoms of the slats 10*a*.

However, this configuration has a problem that since the lift cords 11 disposed between the ladder cords 16 are exposed to the outside, when the lift cords 11 are pulled, a large length of the cords is exposed, so they may cause an accident.

Furthermore, the slats 10*a* connected to the ladder cords 16 can be moved up/down and changed in angle by the pulling string 4, but the pulling string is exposed to the outside, so there is a possibility of a safety accident. Further, it is inconvenient to install and operate the slats.

DOCUMENTS OF RELATED ART (Patent Document 1) Korean Utility Model No. 20-0305692

SUMMARY OF THE INVENTION

The present invention has been made in an effort to solve the problems and an object of the present invention is to provide a cordless safety blind that can preclude a safety accident because lift cords are inserted in conical fabric tubes of ladder cords not to be exposed to the outside and that allows for easily moving up/down and tilting all slats using a central shaft disposed through a driving unit including a rotary body and a rotary gear and using a bottom slats, in which the driving unit can be applied to various blinds such as a Venetian blind and a roll blind.

In order to achieve the objects of the present invention, a cordless safety blind includes: ladder cords in which conical fabric tubes having insertion holes formed through centers of tops of insertion grooves in which slats are inserted, and fabric bodies having tilting cords at both ends are formed in several layers, and lift cords are inserted in the insertion holes; a rotary body which the ladder cords and a central shaft are coupled to; a driving unit in which a rotary gear disposed in a groove of a body and an elastic gear in which a hook of a plate spring is disposed are engaged with each other in the form of a bevel gear to change the direction of a restoring force of the plate spring at 90 degrees using the bevel gear; a fixing pin fixing a force of the plate spring applied in an early stage and disposed on an outer side of the rotary gear to stop the blind at desired positions; a cover having holding protrusions preventing movement of the rotary gear, the elastic gear, and the plate spring; and a central shaft rotatably disposed in shaft holes of the rotary body and the rotary gear.

According to the present invention, since lift cords are inserted in conical fabric tubes of ladder cords not to be exposed to the outside, a safety accident is precluded, so the blind is very safe.

Further, the central shaft disposed through a driving unit including a rotary body and a rotary gear is rotated using a bottom slat, it is possible to simply move up/down and tilt all slats.

Further, the driving unit can be applied to various blinds such as a Venetian blind and a roll blind, so compatibility is excellent.

BRIEF DESCRIPTION OF THE DRAWINGS

The above and other objects, features and other advantages of the present invention will be more clearly understood from the following detailed description when taken in conjunction with the accompanying drawings, in which:

FIG. 28(*b*) and FIG. 28(*c*) are cross-sectional views across the ladder cord from FIG. 5 with the slat inserted into an insertion groove of the ladder cord.

DETAILED DESCRIPTION OF THE INVENTION

Exemplary embodiments of the present invention are described hereafter in detail with reference to the accompanying drawings.

Figure 4:
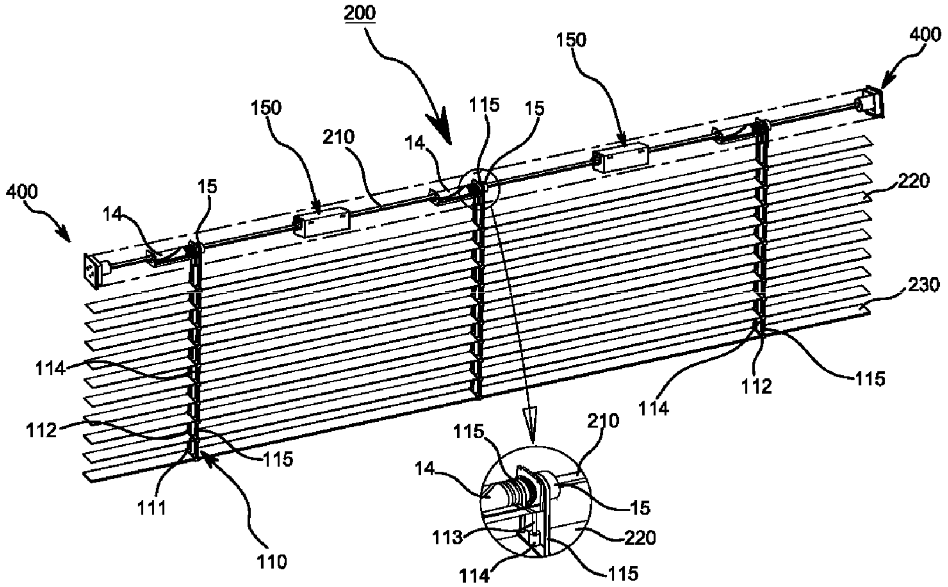
FIG. 4 is a perspective view showing the entire configuration of the present invention.
Figure 15:
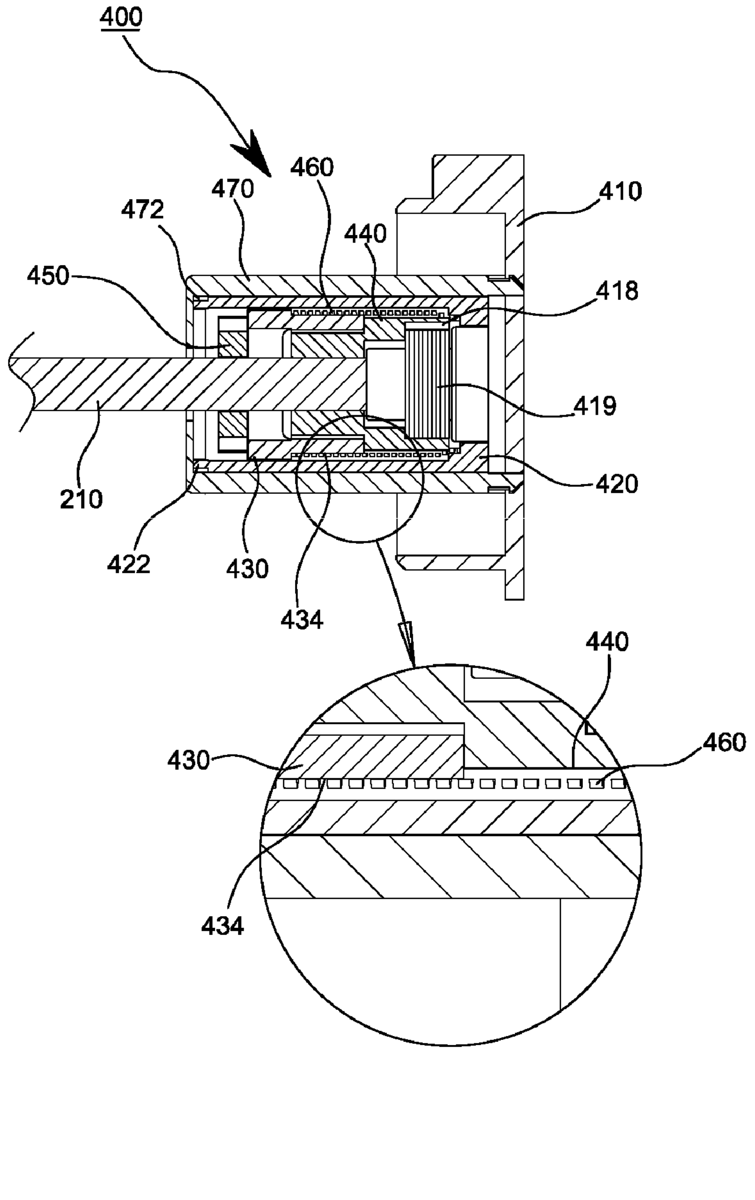
Figure 16:
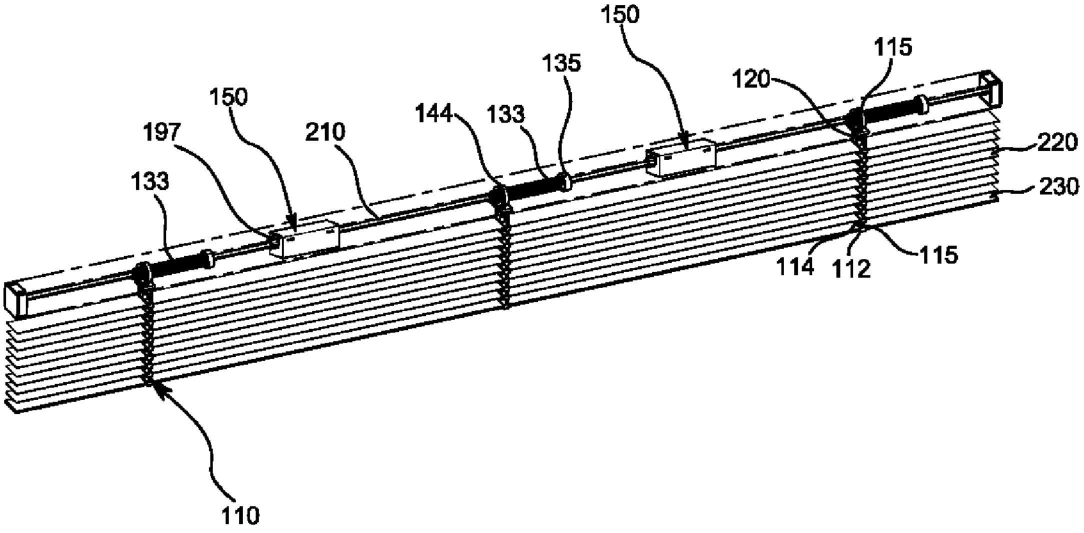
FIG. 16 is a perspective view showing the installation state of the present invention.
Figure 23:
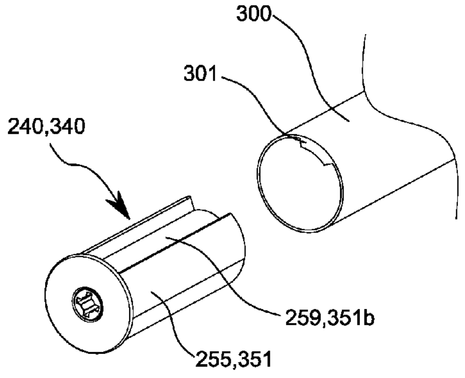
FIG. 23 is a perspective view showing a driving unit and a rotary tube of the present invention.
Figure 24:
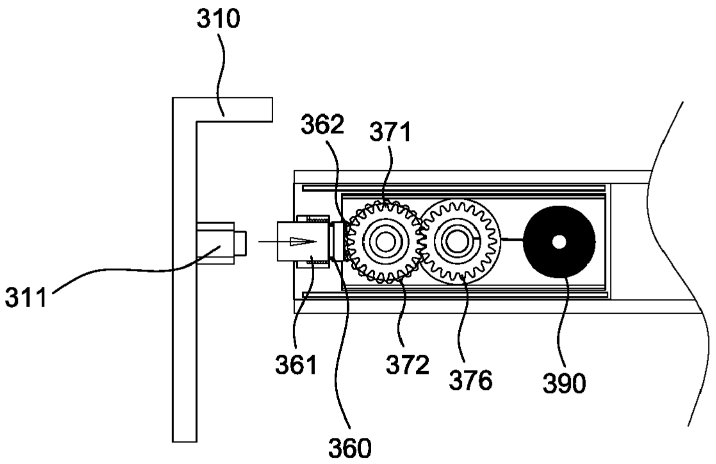
FIGS. 24 to 27 are views showing the use state of the present invention.
Figure 27:
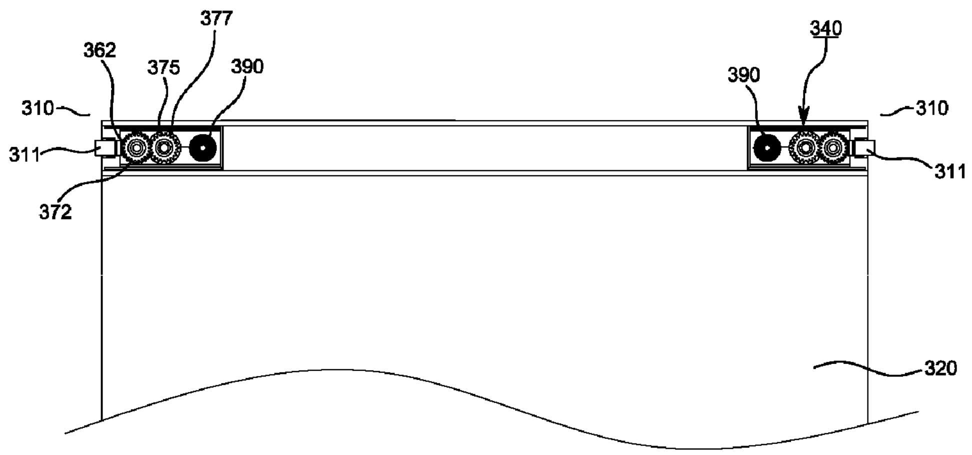
Figure 28A:
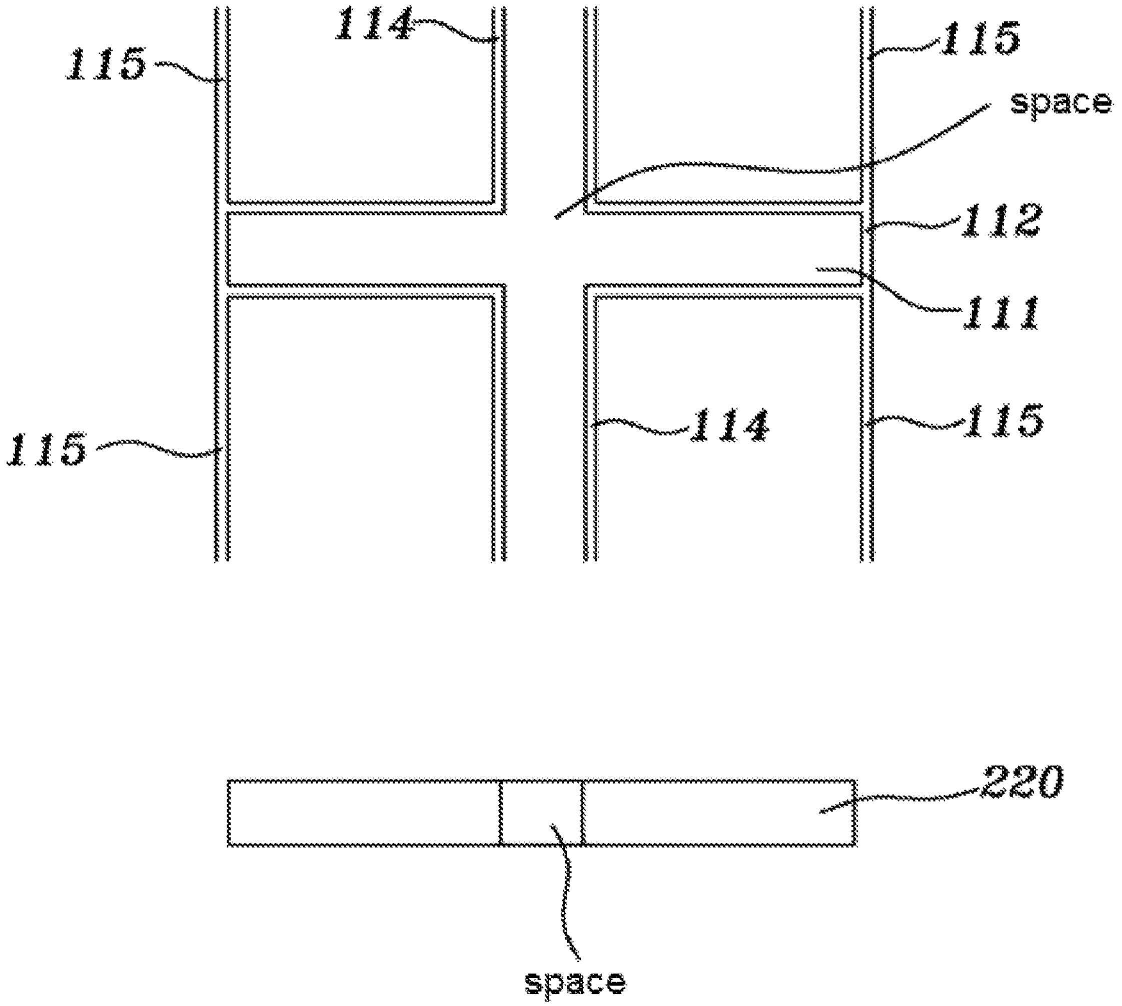
FIG. 28(*a*) are cross-sectional views across a ladder cord from FIG. 5 and a slat.
Figure 28B:
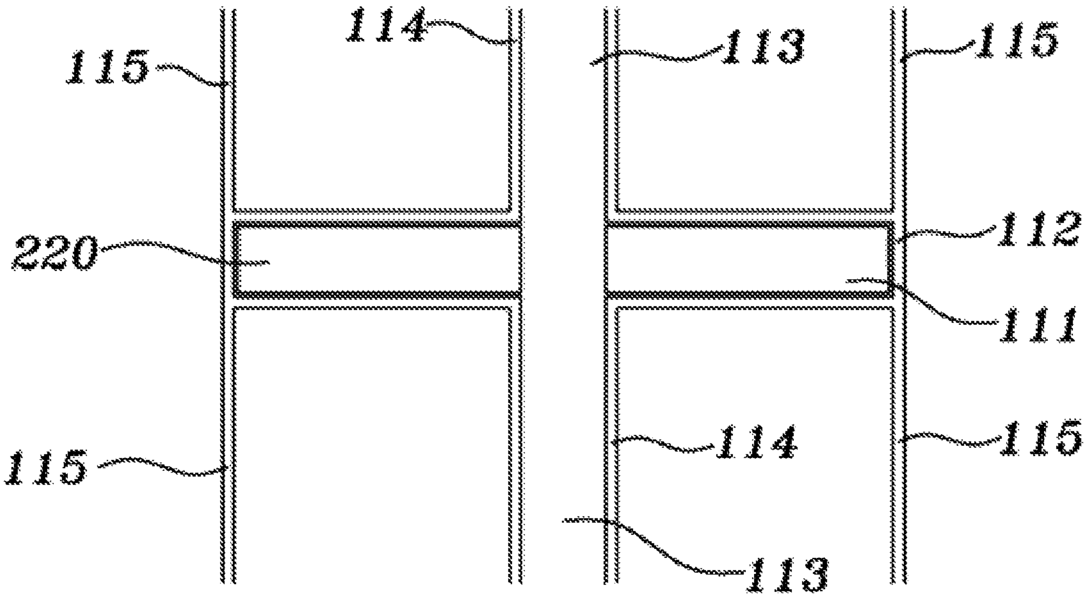
Figure 28C:
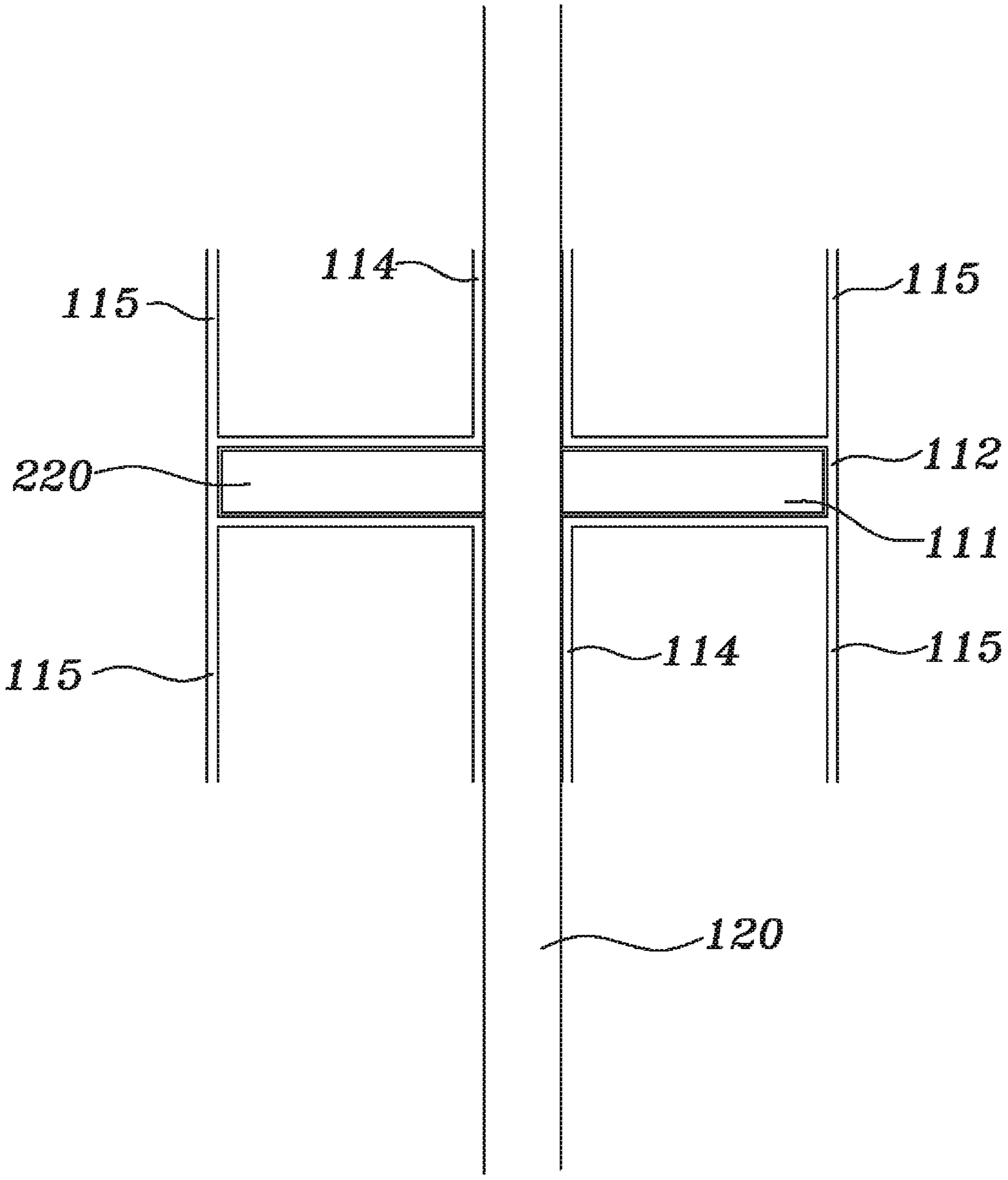

FIG. 4 is a perspective view showing the entire configuration of the present invention, FIGS. 5 to 15, and 17 to 23 are views showing the configuration of components of the present invention, FIG. 16 is a perspective view showing the installation state of the present invention, and FIGS. 24 and 27 are views showing the use state of the present invention.

Reference numeral '200' indicates a cordless safety blind of the present invention.

The cordless safety blind 200 includes ladder cords 110 inserted in fabric tubes 114 such that lift cords 120 are not exposed to the outside, a rotary body on which the ladder cords 110 are disposed, a driving unit 150 including a rotary gear 170 and an elastic gear 180 engaged with each other in a body 160, a central shaft 210 inserted in the rotary body and the rotary gear 170 of the driving unit 150, and a plurality of slats 220 inserted in insertion grooves 111 of the ladder cords 110.

Figure 5:
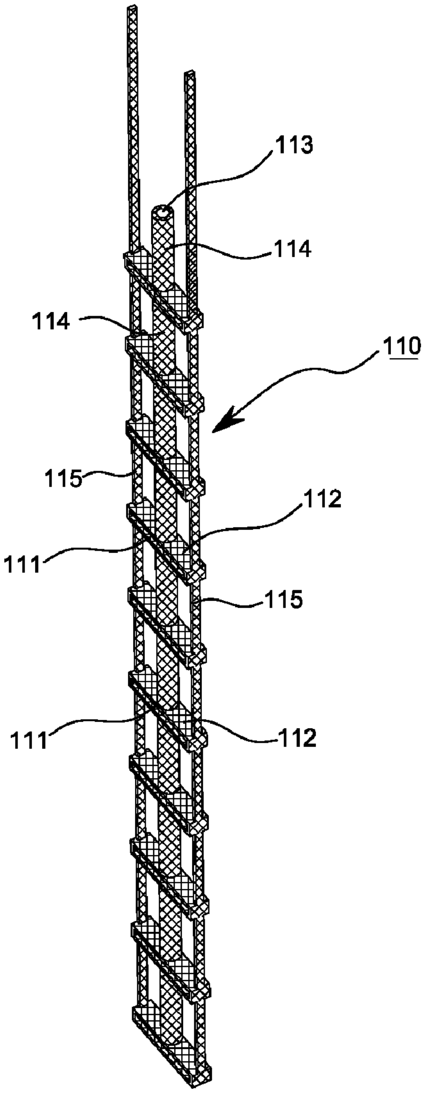
FIGS. 5 to 11 are views showing the configurations of components of the present invention.
Figure 6:
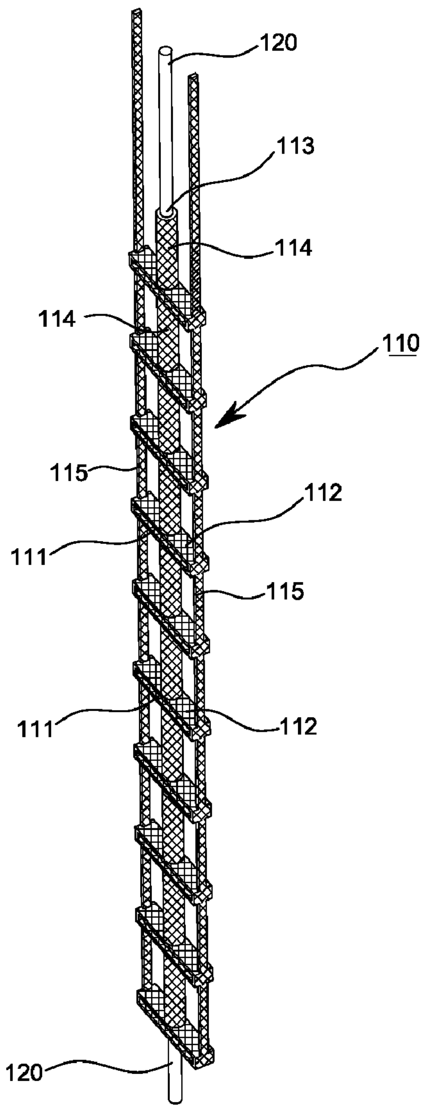

In the ladder cords 110, as shown in FIGS. 5 and 6, conical fabric tubes 114 having an insertion hole 113 formed through the centers of the tops of the rectangular insertion grooves 111 in which the slats 220 are inserted, and fabric bodies 112 having tilting cords 115 at both ends are formed in several layers.

The ladder cords 110 are formed in a net shape using fabrics made of threads, so they can be easily folded and unfolded.

It is possible to form strong and safe fabric ladder cords 110 by adjusting the thickness of the fabric.

The lower ends of the lift cords 120 are inserted in the insertion holes 113 of the fabric tubes 114, so the lift cords 120 are not exposed to the outside and are fixed to the bottom slat 230, so the slats 220 and the fabric bodies 112 are connected.

Figure 1:
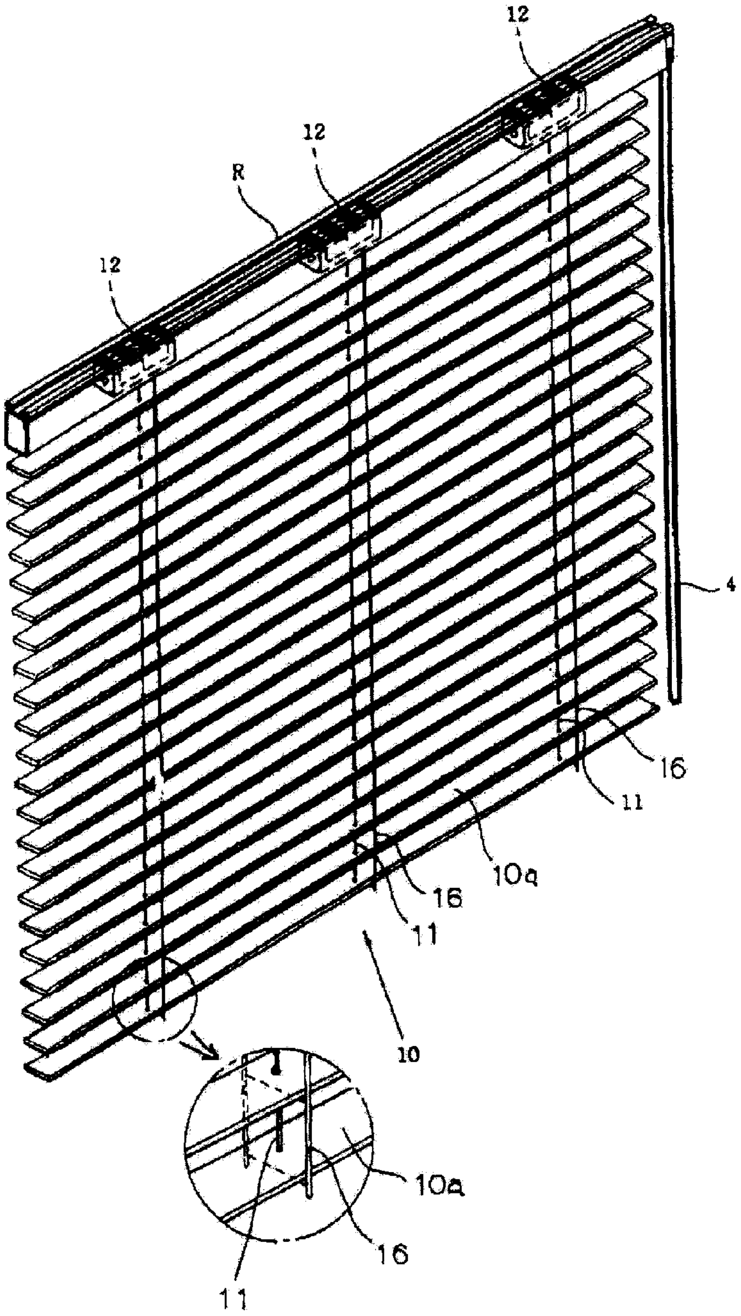
FIG. 1 (BACKGROUND ART)
FIGS. 1 to 3 are perspective views showing the configuration of a blind of the related art.
Figure 2:
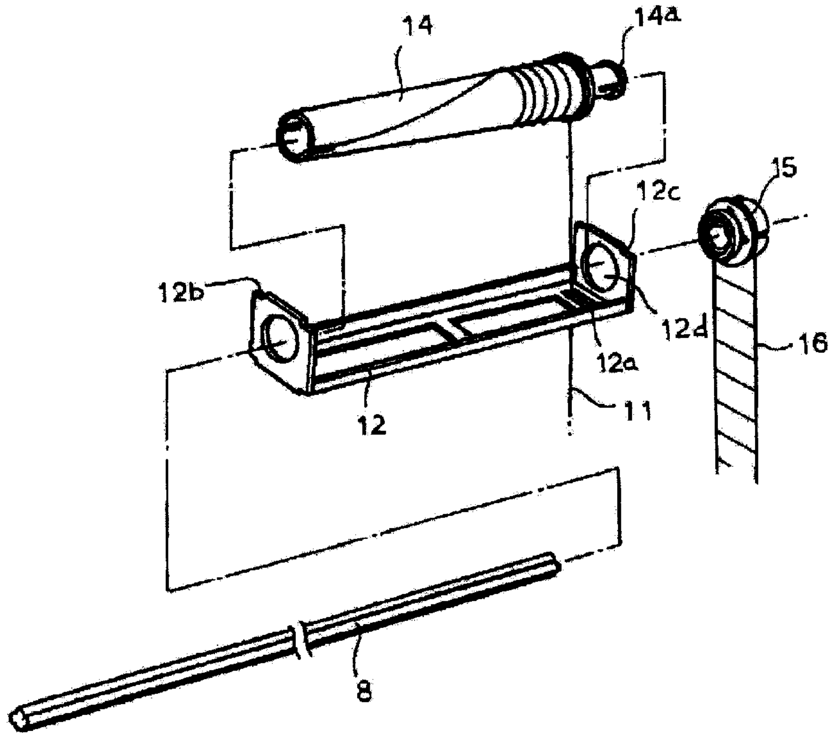
FIG. 2 (BACKGROUND ART)
Figure 3:
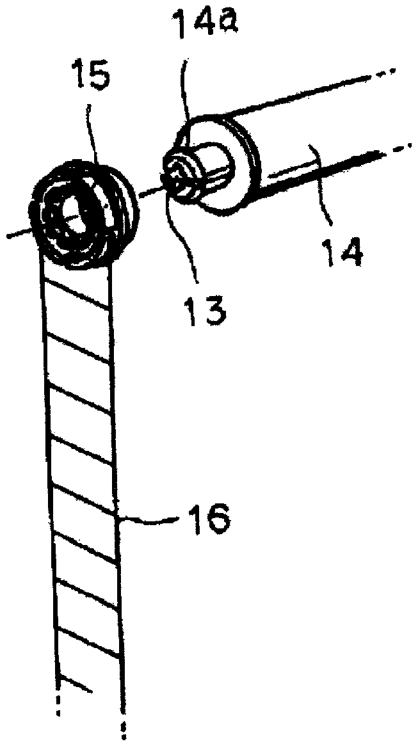
FIG. 3 (BACKGROUND ART)

The rotary body has a well-known configuration, as shown in FIG. 2, the lift cords 120 of the ladder cords 110 are wound on winding reels 114 through through-holes 12*a* of the housing 12, and locking steps 14*a* of the winding reels are inserted in fixing holes 12*d* formed through a coupling plate 12*c* of the housing to protrude outside.

The locking steps 14*a* are inserted in angle change caps 15 and the tilting cords 115 of the ladder cords 110 are fixed to the outer sides of the angle change caps 15.

When the central shaft 210 inserted in the rotary body is rotated, the lift cords 120 are wound on the winding reels 14 and the slats 220 are moved upward.

The lift cords 120 wound on the outer sides of the winding reels 14 make the slats 220 uniformly move up/down and the tilting cords 115 adjust the angles of the slats 220.

Figure 7:
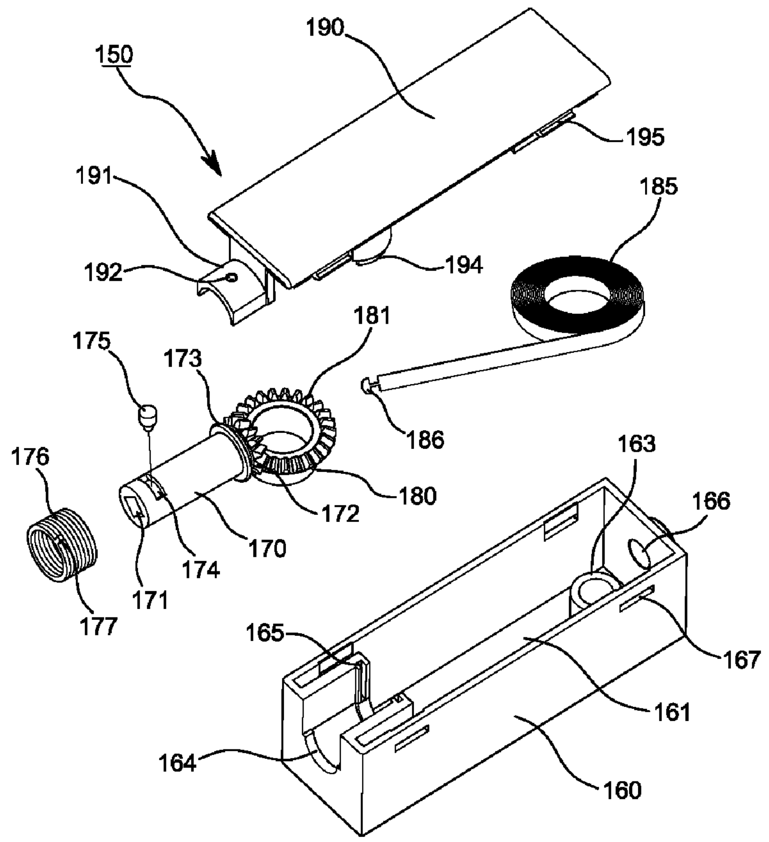
Figure 8:
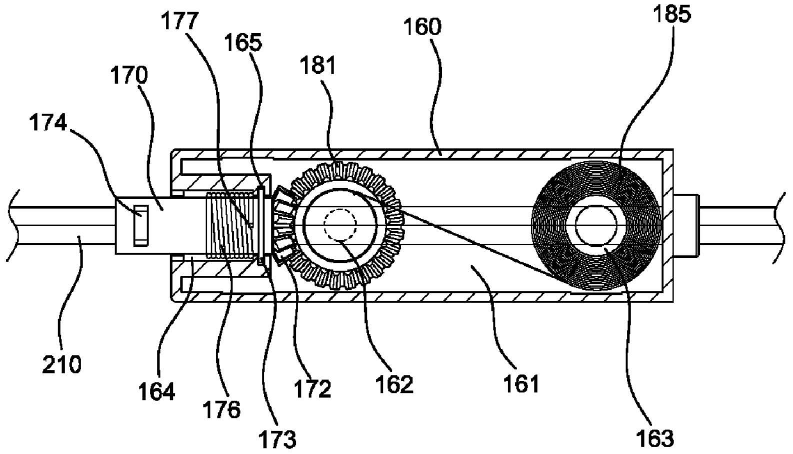
Figure 9:
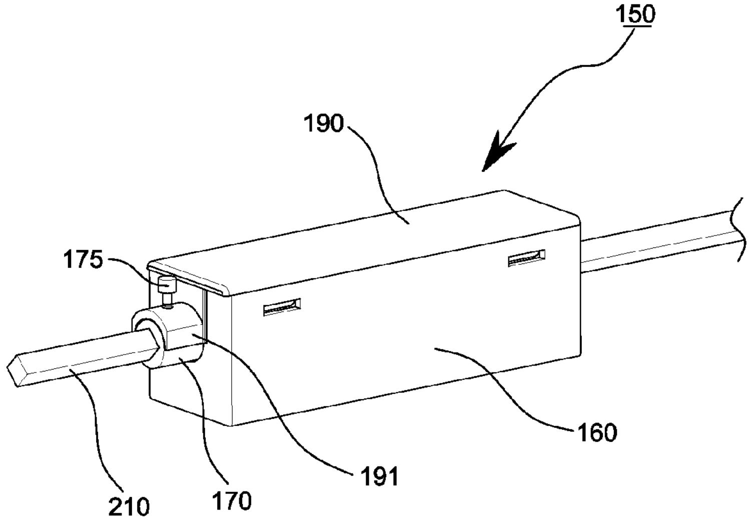

The driving unit 150, as shown in FIGS. 7 to 9, includes: a body 160 open upward and having an internal space; a spring 176 disposed on the outer side of the rotary gear 170 engaged with the elastic gear 180 in the form of a bevel gear in the body 160; a plate spring 185 inserted in a fastening groove 182 of the elastic gear 180; and a cover 190 having retaining protrusions 194 and 196 preventing movement of the rotary gear 170, elastic gear 180, and plate spring 185.

The body 160 has a rectangular shape having an open top and an internal space 161, and an insertion hole 162 in which the elastic gear 180 is inserted and a coupling protrusion 163 protruding upward to fasten the plate spring 176 are formed in the internal space 161.

A groove 164 having a predetermined length is formed on the front of the body 160, a U-shaped insertion groove 165 is formed on the front of the groove 164, and an insertion groove 166 in which the central shaft 210 is inserted is formed on the rear of the groove 164.

A plurality of protrusive grooves 167 is formed on both sides of the body 160.

The rotary gear 170 has a rectangular shaft hole 171 formed therein and a gear 172 on the front and a long insertion hole 174 forming a circular supporting base 173 and receiving a fixing pin 175 on the outer side is formed on the rear of the gear 172.

The spring 176 having a step 177 protruding outward is fitted on the outer side of the rotary gear 170.

Figure 10:
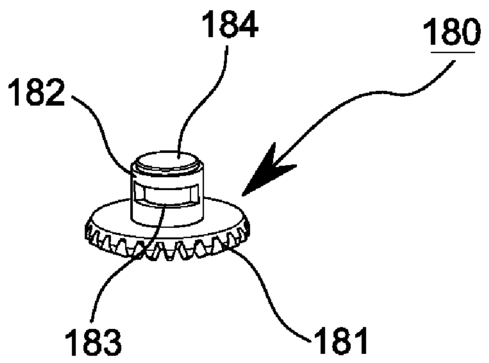

The elastic gear 180, as shown in FIG. 10, has a coupling protrusion 184 protruding outward from the lower end and a gear 181 on the top of a circular shaft 182 having a fastening groove 183 on the outer side thereof.

The coupling hole 162 of the body 160 is fitted on the coupling protrusion 184 of the circular shaft 182 and the rotary gear 170 is disposed in the groove 164 of the body 160, so the gear 172 of the rotary gear 170 and the gear 181 of the elastic gear 180 are engaged with each other in the form of a bevel gear.

The gear ratio of the rotary gear 170 and the elastic gear 180 is 1:1 or 2:1 and power from the plate spring 185 is redirected at 90 degrees and then transmitted to the central shaft 210.

The plate spring 185 is formed by circularly winding a thin steel plate and a hook 186 is formed at the end thereof.

The hook 186 is inserted in the fastening groove 183 of the elastic gear 180, so when the elastic gear 180 is rotated, it is wound on the outer side of the circular shaft 182 and receives elasticity.

Figure 11:
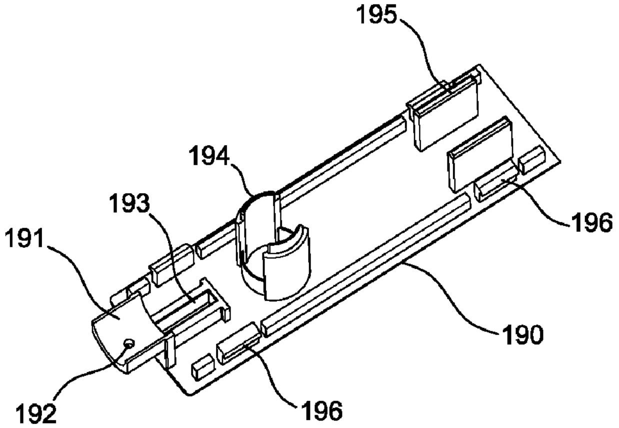

The cover 190, as shown in FIG. 11, has a semicircular supporting plate 161 at the front of the body to support the outer side of the rotary gear 170 and has a pin hole 192 formed through the supporting plate 191.

A retaining groove 193 in which the step 177 of the spring 176 is inserted is formed behind the supporting plate 191 such that the retaining protrusions 194 and 195 on the tops of the elastic gear 180 and the plate spring 185 protrude outside.

The elastic gear 180 and the plate spring 185 are stably rotated by the retaining protrusions 194 and 195.

Fastening protrusions 196 are formed at both sides on the bottom of the cover 190 and are fitted in the protrusive grooves 167 of the body 160, thereby closing the top of the body 160.

The central shaft 10 is a rectangular bar and is disposed through the angle change caps 15 and the shaft hole 171 of the rotary gear 160. The driving units 150 having a plurality of rotary bodies and the rotary gear 170 are disposed with regular intervals on the central shaft 210.

The slats 220 have a rectangular shape, have circular holes formed with regular intervals on the surfaces, and are inserted in the insertion grooves 111 of the fabric bodies 112.

The holes of the slats 220 and the insertion holes 113 of the fabric tubes 114 are aligned and then the lift cords 120 are inserted into the holes and then fixed to the bottom slat 230. The bottom slat 230 has weight, so it functions as a weight.

End caps 400 are fixed to both ends of the central shaft 210 and top case is fastened to the end cap 400.

Figure 12:
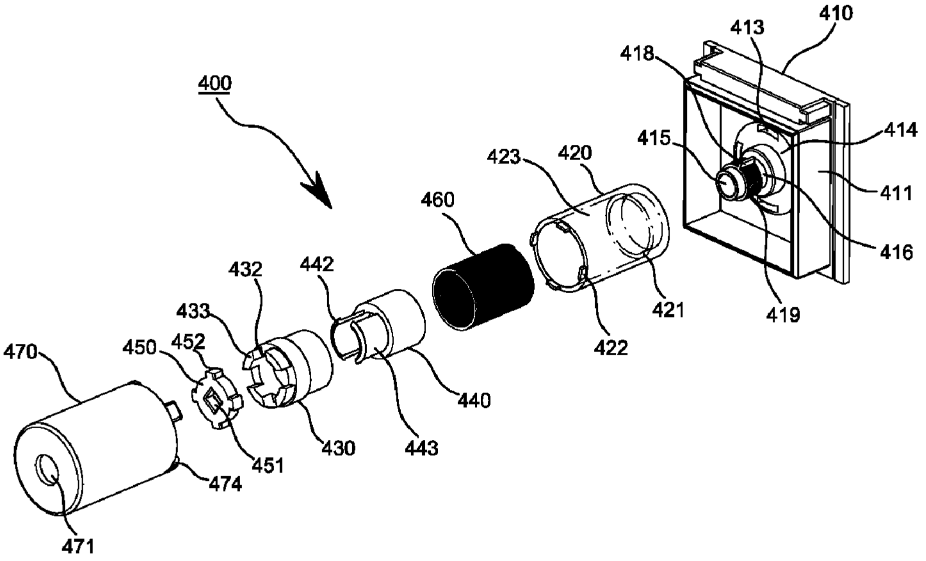
FIGS. 12 to 15 are views showing the configuration of an end cap of the present invention.
Figure 13:
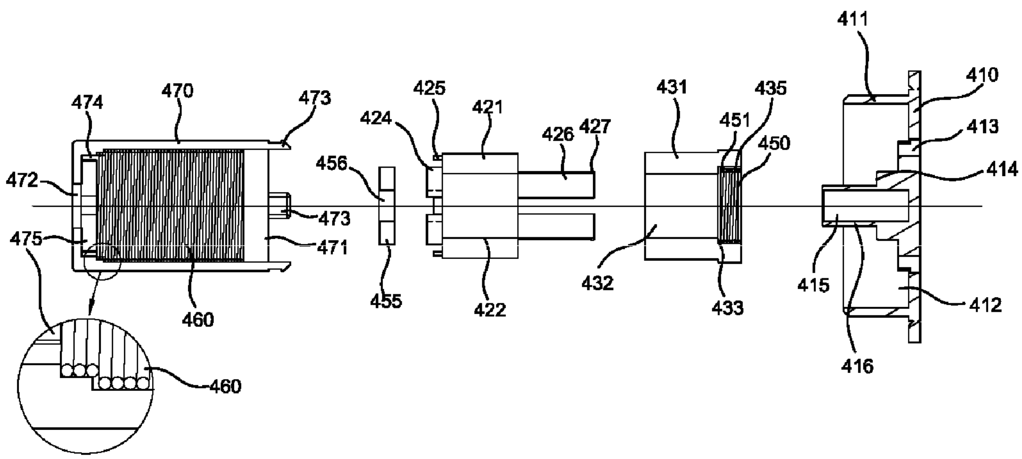

The end caps 400, as shown in FIGS. 12 and 13, each include: a cap 410 having a spring 419 on a shaft coupler 416 fitted on the central shaft 210; a cover 420 having a step 421 on the inner side and fastening protrusions 422 on the outer side of the front portion thereof; a rotary member 430 having a locking step 431 therein and having a protrusion 433 having grooves 432 on the front; a supporting member 440 having a fastening portion disposed on the locking step 431 of the rotary member 430 and having a fastening groove 441 and locking protrusions 442 for fastening a step 418 of the spring 419; a shaft fixer 450 inserted in the grooves 432 of the rotary member 430; a main spring 460 disposed between the outer side of the rotary member 430 and the step 421 of the cover 420; and a lid 470 fixing the cover 420 with protrusions 473 fastened to the fastening grooves 413 of the cap 410.

The cap 410 has a rectangular protrusion 411 protruding forward from a rectangular plate and has a base protrusion 414 having the fastening grooves 413 in which the fastening protrusion 473 of the lid 470 are inserted, at the center of the internal space 412.

The shaft coupler 416 having an insertion hole 415 to receive the central shaft 210 protrudes outward from the center of the base protrusion 414.

The spring 419 having the step 418 is fitted on the shaft coupler 416.

The cover 420 is a cylindrical case having two open sides and an internal space 423, in which the step 421 formed in the internal space 423 and the fastening protrusions 422 protruding outward are formed around the front.

The rotary member 430 has the steps 431 in a cylindrical body and has the protrusion 433 having the grooves 432 formed in a cross shape, and the main spring 460 is fitted on the rotary member 430.

The supporting member 440 has the long fastening groove 441, in which the step 418 of the spring 419 is fitted, at the rear portion in a cylindrical body and has fastening portions 443 each having a locking protrusion 442 and symmetrically formed the front thereof.

The supporting member 440 is inserted in the rotary member 430. The fastening portions 443 of the supporting member 440 are inserted in the rotary member 430, so the locking protrusions 442 are rotatably locked on the locking steps 431.

The shaft fixer 450 has a rectangular shaft hole 451 at the center of a circular plate and has rectangular protrusions 452 formed in a cross shape on the outer side.

The rectangular protrusions 452 of the shaft fixer 450 are inserted and fixed in the grooves 432 of the rotary member 430, so the shaft fixer 450 and the rotary member 430 are rotated by rotation of the central shaft 210.

An end of the main spring 460 is fastened to the outer side of the rotary member 430 and the other end is disposed inside the step 421 of the cover 420.

The rotary member 430 is larger in diameter than the supporting member 440, so the supporting member 440 fastened to the rotary member 430 is freely rotated with interference of the main spring 460.

Figure 14:
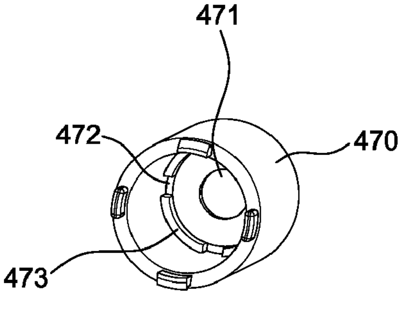

The lid 470, as shown in FIG. 14, has a shaft insertion hole 471, has a reinforcing protrusion 473 having insertion grooves 472 formed in a cross shape on the front of the internal space, and has a plurality of fixing protrusions 474 protruding outward from the rear.

The supporting member 440 fastened to the rotary member 430 and the cover 420 in which the main spring 460 fitted on the rotary member 430 is inserted are inserted in the internal space of the lid 470, and the fastening protrusions 422 are inserted and fixed in the insertion grooves 472 of the lid 470.

The lid 470 is fixed to the cap 410 by inserting the fixing protrusions 474 of the lid 470 into the fastening grooves 413 of the cap 410.

The lid 470 fixes the cover 420 and allows the rotary member 430 to rotate with rotation of the central shaft 210.

As shown in FIG. 15, ends of the central shaft 210 are inserted in the insertion grooves 415 of the caps 410 through the shaft fixers 150 and the rectangular shaft holes 451, and the end caps 400 are coupled to the ends.

The present invention described above is applied to a Venetian blind and an embodiment thereof is described hereafter.

First, tension is adjusted in advance by applying elasticity in advance to the plate spring by inserting and rotating the central shaft 210 in the rectangular shaft hole 171 of the rotary gear 170 disposed in the body 160 and then rotation of the central shaft 210 is restricted by fixing the fixing pin 175 in the pin hole 192 of the cover 190 to maintain the elasticity applied to the plate spring 185.

Next, when the winding reels 14 are rotated and wind the lift cords 120 to a side, as shown in FIG. 16, the fabric bodies 112 are moved upward with the slats 220 inserted therein, thereby fixing the central shaft 210.

The rotary bodies 130 and the driving units 150 are disposed with regular intervals on the central shaft 210 and then the fixing pin 175 is removed from the cover 190, thereby releasing the plate spring 185.

In this state, when a user holds and pulls down the bottom slat 230 having weight, the rotary gears 170 in which the central shaft 210 is inserted are rotated and the elastic gears 180 engaged with the rotary gear 170 are also rotated and wind the plate springs 185, whereby elasticity is applied to the elastic gears and power from the plate springs 185 is changed in direction at 90 degrees and then transmitted to the central shaft 210.

In this process, the springs 176 having the steps 177 inserted in the retaining grooves 193 of the covers 190 function as brakes by receiving elasticity, but the weight of the bottom slat 230 and the force of the user pulling down the bottom slat 230 are larger than the force of the springs 176, so the central shaft 210 is rotated.

Furthermore, the springs 419 having the steps 418 inserted in the fastening grooves 441 of the supporting members 440 are operated in the same way.

The rotary members 430 are rotated in the opposite direction to the winding direction of the main springs 460, so they can be rotated with interference of the main springs 460.

As the central shaft 210 is rotated, the winding reels 14 are rotated and the lift cords 120 wound on the winding reels 14 are unrolled, so the fabric bodies 112 combined with the slats 220 are moved down.

In this state, when the user stops the bottom slat 230 at a desired position, the bottom slat 230 remains stopped with the weight thereof limiting elasticity of the plate springs 185.

When the user lifts the bottom slat 230 having weight with the slats moved down and stopped at the positions, as described above, the weight of the bottom slat 230 is offset and the elasticity of the contracted plate springs 185 is removed, whereby the central shaft 210 is rotated in the opposite direction.

The elasticity of the plate springs 185 is larger than the elasticity of the springs 176, so the central shaft 210 is rotated. Further, when the lift cords 120 are wound upward around the winding reels 14, the fabric bodies 112 combined with the slats 220 are also moved upward.

In this state, when the user takes the hand off the bottom slat 230, the offset weight is applied again to the bottom slat 230, so the center of gravity of the bottom slat 230 faces down.

Figure 17:
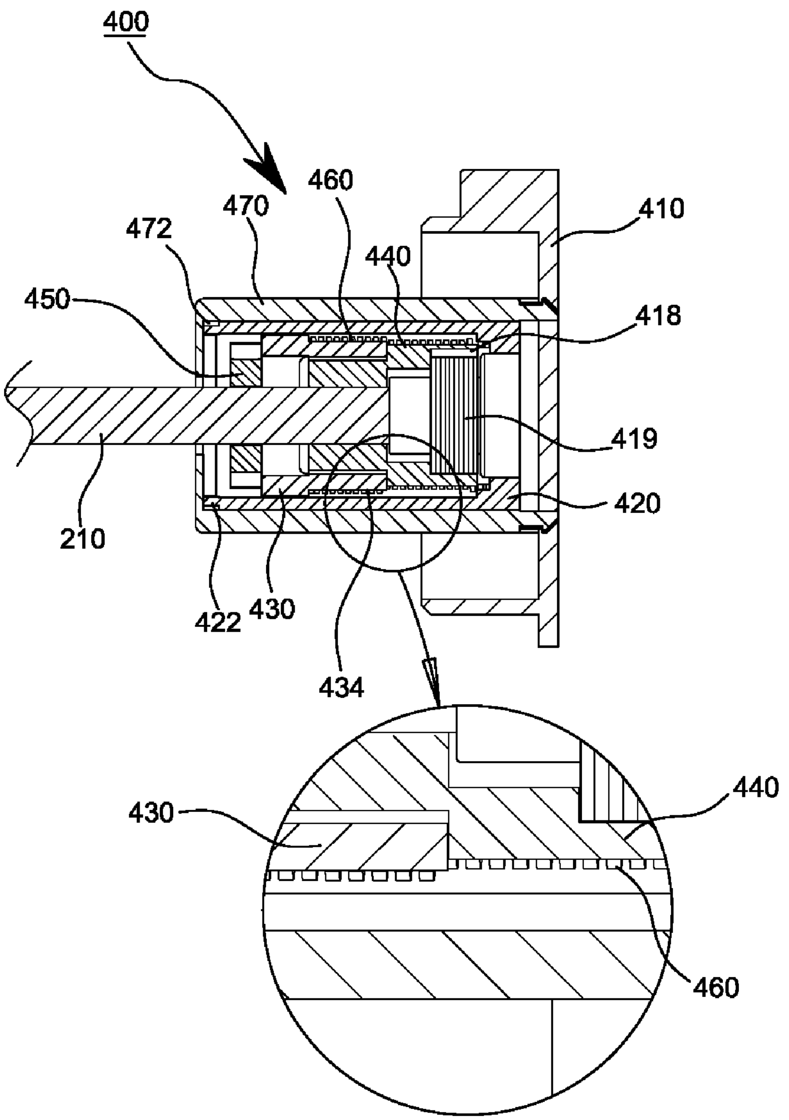
FIG. 17 is a cross-sectional view showing the coupling state of the end cap of the present invention.

As shown in FIG. 17, the main springs 460 are rotated in the same direction as the winding direction of the main spring 460 by the rotary members 430 with an end thereof fixed inside the steps 421 of the cover 420. Further, since the main springs 460 are fitted on the outer sides of the supporting members 440 smaller in diameter than the rotary members 430, the supporting members 400 are not rotated and maintained in the stop state.

In this state, when the bottom slat 230 is lifted again, the weight of the bottom slat 230 is offset and the bottom slat 230 is lifted.

Figure 18:
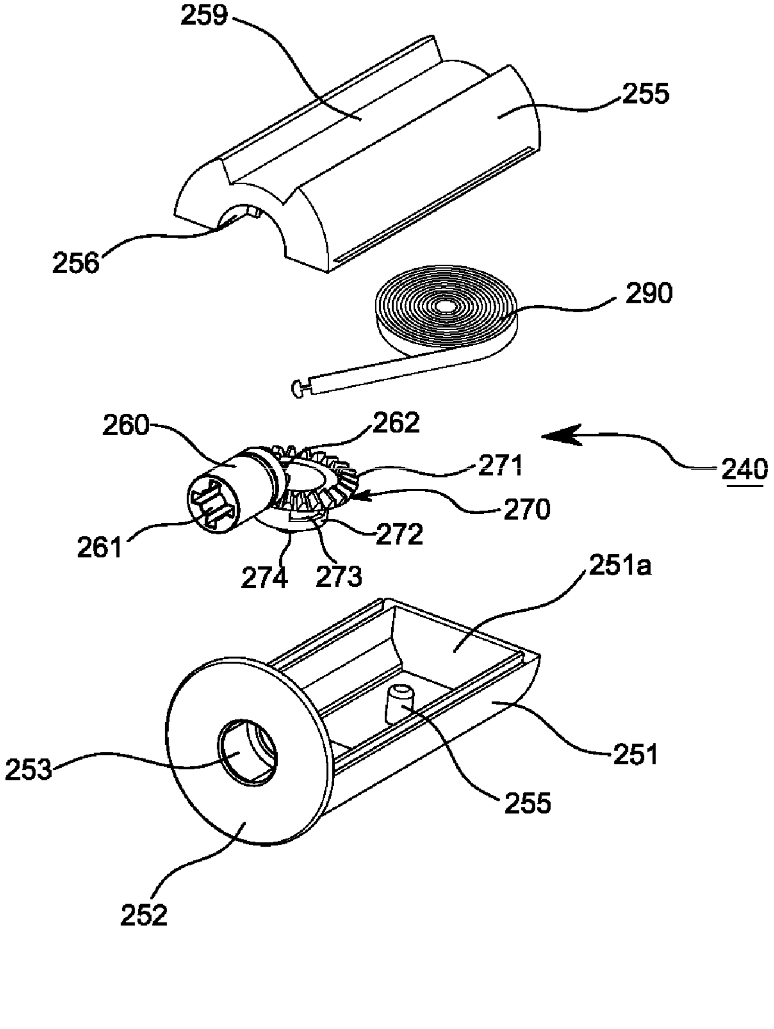
FIGS. 18 and 19 are views showing another configuration of a driving unit of the present invention.
Figure 19:
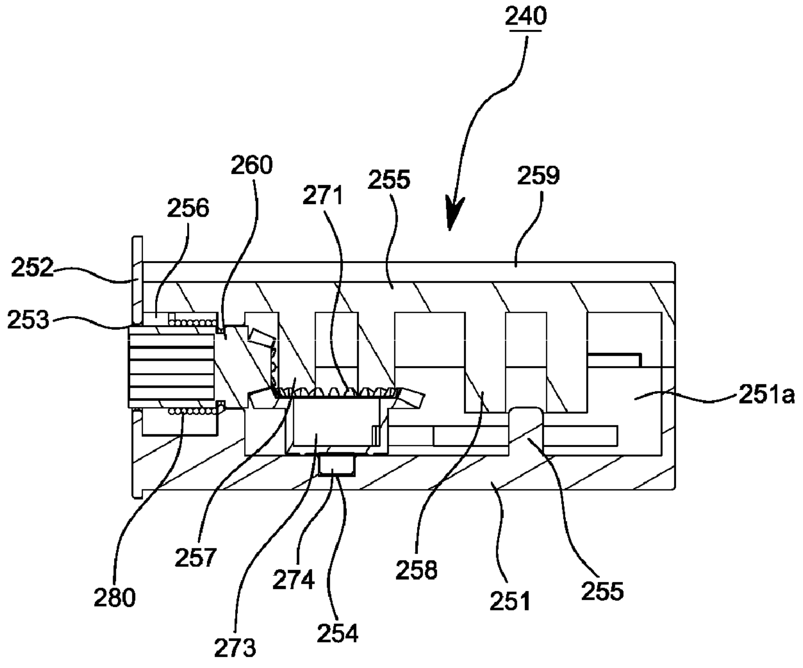
Figure 20:
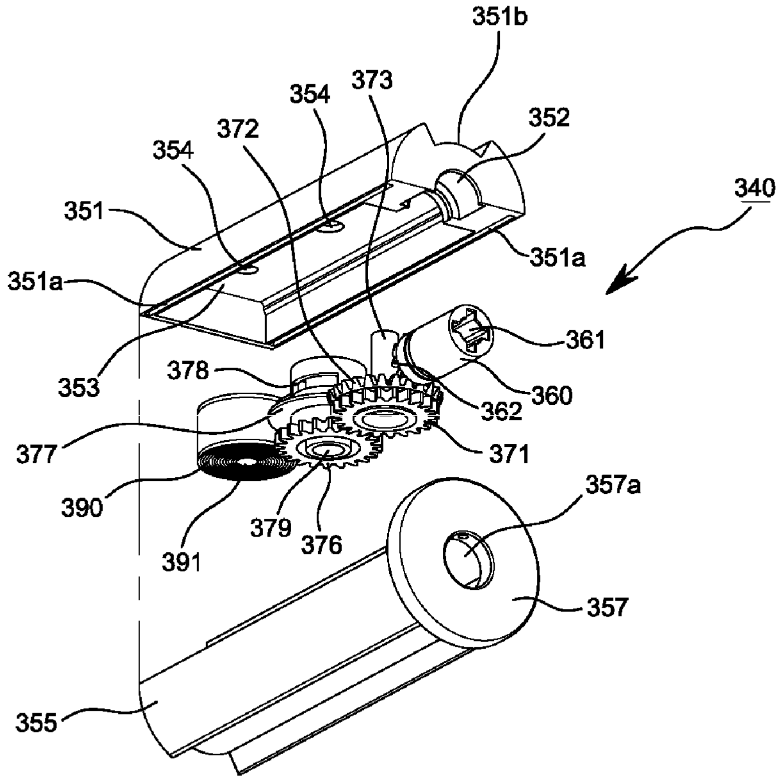
FIGS. 20 to 22 are views showing another configuration of a driving unit of the present invention.
Figure 21:
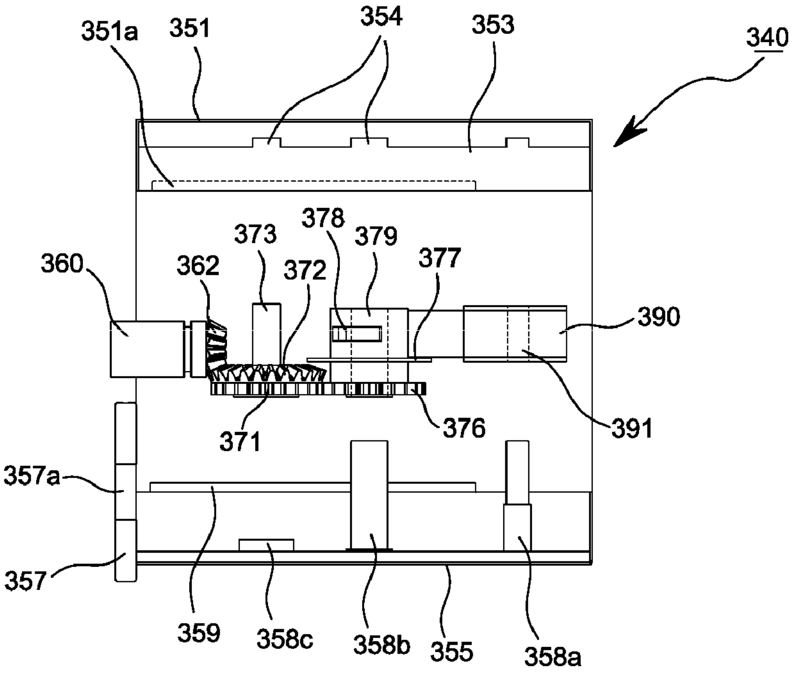

Another configuration of the driving unit described above is described hereafter with reference to FIGS. 18 and 19.

A driving unit 240 includes: a body divided into two parts and composed of top cover 255 and a bottom body 251; an elastic spring 280 combining a rotary gear 260 and an elastic gear 270 in the form of a bevel gear in the bottom body 251 and fastened to the outer side of the rotary gear 260; a plate spring 290 fastened to the elastic gear 270; and the top cover 255 having retaining protrusions 257 and 258 preventing separation of the elastic gear 270 and the plate spring 290 disposed in the bottom body 251.

The body is composed of the bottom body 251 and the top cover 255 and the bottom body 251 has a circular fixed plate 252 having a predetermined thickness on the front and has an internal space 251*a* behind the fixed plate 252.

A circular insertion hole 253 is formed at the center of the fixed plate 252, a shaft insertion hole 254 in which a rotary protrusion 274 of the elastic gear 270 is inserted is formed in the internal space 251*a*, and a coupling protrusion 255 for fastening the plate spring 290 protrudes upward in the internal space 251*a*.

The top cover 255 has a semicircular insertion hole 256 at the front, retaining protrusions 257 and 258 protruding downward therein, and a coupling groove 259 longitudinally on the outer side thereof. The elastic spring 280 is inserted in the insertion hole 253 of the fixed plate 252.

The rotary gear 260 has a shaft hole 261 at the rear of a circular body and a vertical gear 262 on the front.

The rotary gear 260 is inserted in the insertion hole 253 of the fixed plate 252 and the vertical gear 262 on the front is disposed in the internal space 251*a* of the bottom body 251. The elastic spring 280 is fitted on the rotary gear 260, so the elasticity of the elastic spring 280 is applied to the rotary gear 260.

The elastic gear 270 has a coupling protrusion that protrudes downward from the bottoms of a horizontal gear 271 and a fastening groove 273 in which a hook 291 of the plate spring 290 is inserted is formed on the outer side of the coupling protrusion 272.

The rotary protrusion 274 protrudes downward from the bottom of the coupling protrusion 272 and is inserted in the shaft insertion hole 254 of the bottom body 251.

The vertical gear 262 and the horizontal gear 271 are engaged with each other in the form of a bevel gear, the gear ratio is 1:1 or 2:1, and the elasticity of the plate spring 185 is redirected at 90 degrees and then transmitted to the driving unit 240.

A driving unit 340 different from the driving units described above is described with reference to FIGS. 20 and 22.

According to the driving unit 340, a rotary gear 360, an elastic gear 270, and an interlocking gear 375 are engaged with one another in an internal space of a body composed of a top cover 355 and a bottom body 351 and a plate spring 390 is fixed to the interlocking gear 375.

The top cover 351 has a semicircular groove 352 at the front in which the rotary gear 360 is inserted, a plurality of coupling grooves 354 in the internal space 353, and longitudinally elongated fastening grooves 351*a* at both sides on the top.

Figure 22:
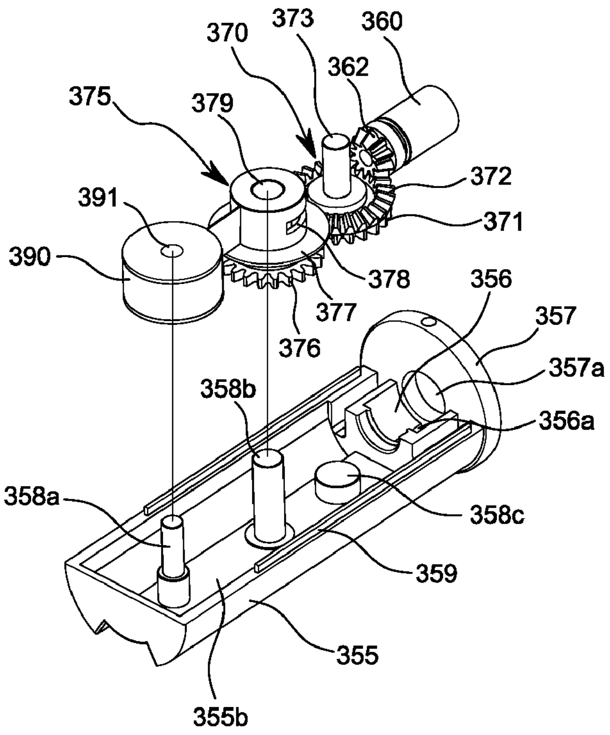

The bottom body 355 has a circular base plate 357 having an insertion hole 357*a* at the center and a semicircular insertion groove 356 having a groove 356*a* on the inner side in which a step 281 of the elastic spring 280 is inserted, as shown in FIG. 22.

In an internal space 355*b*, coupling protrusions 358*a* and 358*b* inserted in the plate spring 390 and the interlocking gear 375 to function as a shaft are formed and a retaining protrusion 358*c* being in close contact with the top of the elastic gear 370 is formed.

Fastening protrusions 359 protruding upward are longitudinally formed on the tops of both sides of the bottom body 355 and are inserted in the fastening grooves 351*a* of the top cover 351, thereby forming a single body.

The rotary gear 360 has a shaft hole 261 on the rear of a circular body and a vertical gear 262 on the front.

The elastic gear 370 has two symmetric top and bottom gears, in which the upper one is a bevel gear 372 and the lower one is a spur gear 371, and a rotary shaft 373 protruding upward is elongated at the center of the gears. The upper end of the rotary shaft 373 is inserted in a coupling groove 354 of the top cover 351 and the bottom of the spur gear 371 is supported by a retaining protrusion 358*c* of the bottom body 355.

The interlocking gear 375 has a gear 376 on the bottom and a circular guide plate 377 over the gear 376 to safely guide the elastic spring 390. Further, a fastening groove 378 in which the hook of the plate spring 390 is formed on the outer side of the body.

The gear 376 is engaged with the spur gear 371 of the elastic gear 370, so the interlocking gear 375 and the elastic gear 370 are rotated in the same direction.

A shaft hole 379 formed at the center of the interlocking gear 375 is rotatably fitted on the coupling protrusion 358*b* of the bottom body 355.

The fastening groove 378 of the interlocking gear 375 fixes the front end of the plate spring 380 to the fastening groove 378 and the shaft hole 391 is rotatably fitted on the coupling protrusion 358*a* of the bottom body 355.

The rotary gear 260 is inserted in the insertion grooves 352 and 356 of the body and receives elasticity of the elastic spring 280, and the vertical gear 262 exposed to the internal space 353 and 355*b* is engaged with the bevel gear 372 on the top of the elastic gear 370.

The gear 276 of the interlocking gear 275 is engaged with the spur gear 371 on the bottom of the elastic gear 370.

The vertical gear 362 is engaged with the bevel gear 372 and the power from the plate spring 390 is changed in direction at 90 degrees through the interlocking gear 375 engaged with the vertical gear 362 and is then transmitted to the driving unit 350.

According to the driving unit 340, it is easy to secure the internal space of the body and the plate spring 390 is stably rotated, so a long rotary tube can be rotated by small tension.

The driving units 240 and 340, as shown in FIG. 23, are inserted in a rotary tube 300 and a protrusion 301 formed in the rotary tube 300 is fitted in the coupling grooves 259 and 351*b* of the top covers 255 and 351.

Figure 26:
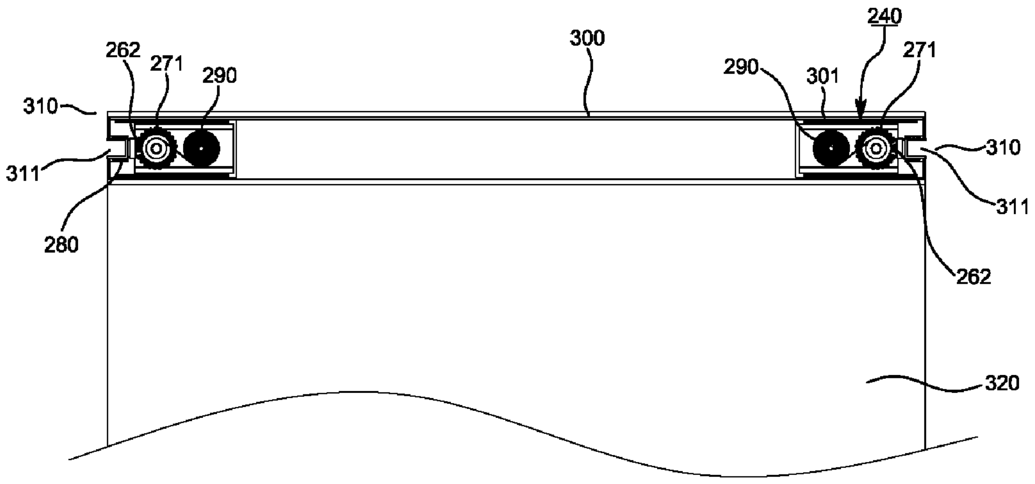

A shaft 311 of a bracket 310 is inserted in the shaft holes 261 and 361 of the rotary gears 260 and 360, as shown in FIGS. 24 and 26.

The configuration of another driving unit described above is applied to a roll blind and an embodiment thereof is described with reference to FIGS. 24 to 26.

A blind fabric 320 is wound on the rotary tube 300 and bottom bar having weight is fastened to the lower end of the fabric 320.

When a user holds and pulls down the bottom bar, the rotary tube 300 is rotated and the rotary gear 260 is rotated, and the spur gear 271 of the elastic gear 270 being in contact with the vertical gear 262 of the rotary gear 260 is rotated.

Further, the plate spring 280 is wound on the coupling protrusion 272 of the elastic gear 270 and receives elasticity, whereby it is moved down to the lower portion of the fabric 320.

When the user lets go of the bottom bar at a desired position, the rotary gear 260 is stopped and is not rotated by the tension of the elastic spring 280.

When the user lifts the bottom bar in this state, the weight of the bottom bar is offset and the elasticity of the contracted plate spring 290 is removed, so the rotary gear 260 is rotated in the opposite direction and the fabric 320 is moved up.

Figure 25:
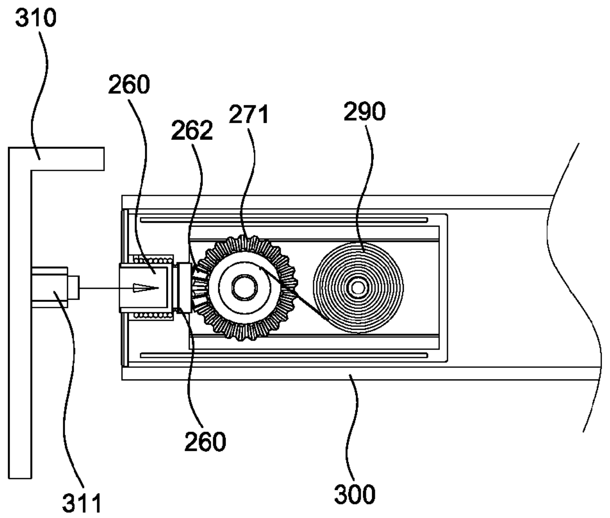

Another configuration of the present invention is described hereafter with reference to FIGS. 25 and 27.

When a user holds and pulls down the bottom bar, the rotary tube 300 is rotated and the rotary gear 360 is rotated, and the bevel gear 272 of the elastic gear 370 being in contact with the vertical gear 360 of the rotary gear 362 is rotated.

Further, the interlocking gear 375 engaged with the spur gear 271 of the elastic gear 370 is rotated, the plate spring 390 is wound along a guide plate 377 of the interlocking gear 375, and the fabric 320 is moved down by elasticity.

When the user lets go of the bottom bar at a desired position, the rotary gear 360 is stopped and is not rotated by the tension of the elastic spring 280.

When the user lifts the bottom bar in this state, the weight of the bottom bar is offset and the elasticity of the contracted plate spring 390 is removed, so the rotary gear 360 is rotated in the opposite direction and the fabric 320 is moved up.

What is claimed is:

1. A cordless operating safety blind, comprising:

ladder cords in which conical fabric tubes and fabric bodies are formed in several layers, the fabric bodies including longitudinal ends at which tilting cords are located, the conical fabric tubes having insertion holes, the fabric bodies including insertion grooves in which slats are inserted, the conical fabric tubes being formed through centers of tops of insertion grooves, and lift cords inserted in the insertion holes;

a rotary body having a central shaft fastened to the lift cords;

a driving unit in which a rotary gear disposed in a groove of a body and an elastic gear in which a hook of a plate spring is disposed are engaged with each other thereby forming a bevel gear mechanism and a restoring force of the plate spring is changed in direction by 90 degrees by way of the bevel gear mechanism; and a cover having holding protrusions preventing movement of the rotary gear, the elastic gear, and the plate spring;

wherein the central shaft is rotatably disposed in shaft holes of the rotary body and the rotary gear, and end caps are disposed at both ends of the central shaft, and wherein the end cap includes:

a cap having a shaft coupler formed at a center of a base protrusion having a plurality of fastening grooves to be fitted on the central shaft, and having a spring having a step and fitted on an outer side of the shaft coupler;

an end cap cover disposed in the shaft coupler, having a step therein, and having a plurality of fastening protrusions on an outer side of a front;

a rotary member having a locking step therein and a protrusion having a plurality of grooves on a front;

a supporting member having a fastening portion at a front disposed on the locking step of the rotary member and having a fastening groove and locking protrusions for fastening a step of the spring;

a shaft fixer disposed on a front of the rotary member and having a rectangular shaft hole at a center;

a main spring having an end fastened to an outer side of the rotary member and the other end fixed inside a step of the end cap cover; and a lid having a plurality of fastening grooves therein, having a fixing protrusion on an open rear to fix the end cap cover by fastening the fixing protrusion to a fastening groove of the cap.

2. The cordless operating safety blind of claim 1, wherein the body is divided into a bottom body and a top cover having retaining protrusions; and wherein the driving unit includes:

an elastic spring fastened to an outer side of the rotary gear; and the plate spring fastened to the elastic gear.

3. The cordless operating safety blind of claim 1, wherein one of the slats is a bottom slat, and wherein the end cap prevents the bottom slat from moving down due to weight when offset weight is applied to the bottom slat.

4. The cordless operating safety blind of claim 1, wherein the ladder cords are formed using fabrics fabricated by weaving threads.

* * * * *